US011478821B2

(12) United States Patent
Hamada et al.

(10) Patent No.: US 11,478,821 B2
(45) Date of Patent: Oct. 25, 2022

(54) VIBRATION GENERATING DEVICE

(71) Applicant: TAIYO YUDEN CO., LTD., Tokyo (JP)

(72) Inventors: Hiroshi Hamada, Takasaki (JP); Yukihiro Matsui, Takasaki (JP); Fumihisa Ito, Takasaki (JP); Takashi Tomita, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 925 days.

(21) Appl. No.: 16/276,488

(22) Filed: Feb. 14, 2019

(65) Prior Publication Data

US 2019/0262864 A1 Aug. 29, 2019

(30) Foreign Application Priority Data

Feb. 26, 2018 (JP) .............................. JP2018-031771

(51) Int. Cl.
*B06B 1/06* (2006.01)
*G06F 3/01* (2006.01)
(52) U.S. Cl.
CPC .......... *B06B 1/0603* (2013.01); *B06B 1/0644* (2013.01); *B06B 1/0648* (2013.01); *B06B 1/0662* (2013.01); *G06F 3/016* (2013.01)
(58) Field of Classification Search
CPC ... B06B 1/0603; B06B 1/0644; B06B 1/0648; B06B 1/0662; G06F 3/016
See application file for complete search history.

(56) References Cited

U.S. PATENT DOCUMENTS

| | | | |
|---|---|---|---|
| 10,165,371 B2* | 12/2018 | Ishii | H04R 7/045 |
| 2006/0227981 A1 | 10/2006 | Miyata | |
| 2015/0049434 A1* | 2/2015 | Sato | G06F 1/1626 |
| | | | 361/679.56 |
| 2017/0311086 A1* | 10/2017 | Ishii | H04R 7/045 |
| 2019/0248560 A1* | 8/2019 | Kim | G06F 1/1637 |
| 2021/0345028 A1* | 11/2021 | Kim | H04R 1/028 |

FOREIGN PATENT DOCUMENTS

| | | |
|---|---|---|
| JP | 2016154298 A | 8/2016 |
| WO | 2004023199 A1 | 3/2004 |

OTHER PUBLICATIONS

A Notice of Reasons for Refusal issued by the Japanese Patent Office, dated Jan. 4, 2022, for Japanese counterpart application No. 2018-031771. (2 pages).

* cited by examiner

*Primary Examiner* — J. San Martin
(74) *Attorney, Agent, or Firm* — Law Office of Katsuhiro Arai

(57) ABSTRACT

A vibration generating device 90 includes: a housing 30 in a rectangular shape as viewed in a first direction, the housing 30 comprising: a first support portion 31 extending along a first side in a second direction perpendicular to the first direction and; a second support portion 32 extending along a second side opposite to the first side in the second direction; a panel 60 supported by the first support portion and the second support portion; and a piezoelectric element 11 attached to the panel in such a manner as to be shifted in the second direction toward the first side with respect to a central portion of the panel, wherein a width in the second direction of a portion of the panel supported by the first support portion is larger than a width in the second direction of a portion of the panel supported by the second support portion.

6 Claims, 3 Drawing Sheets

[FIG. 1A]
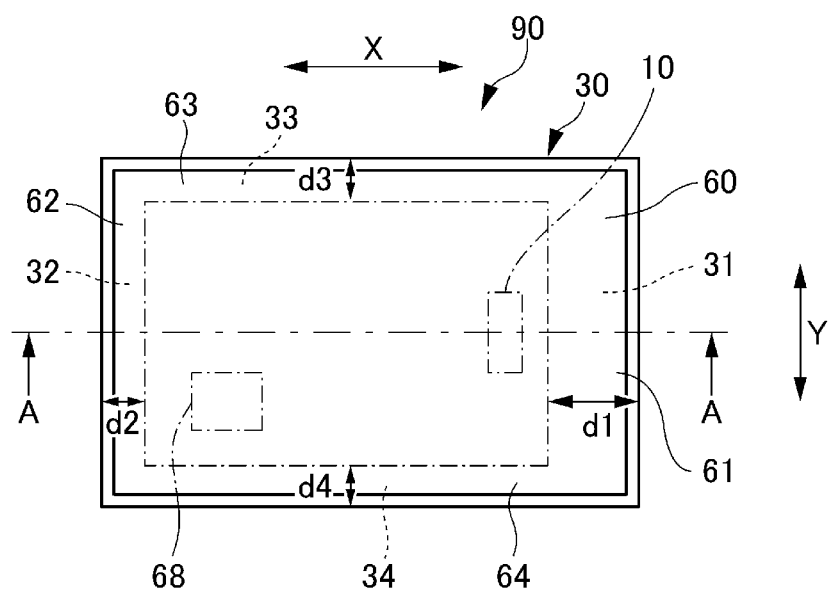
[FIG. 1B]
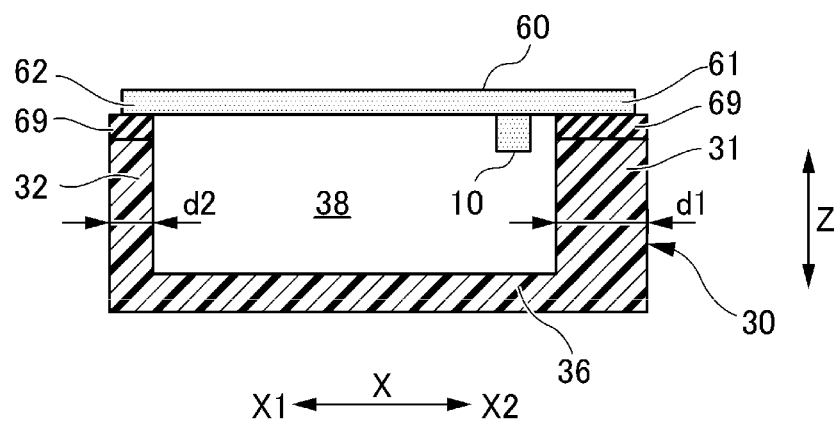

[FIG. 2]
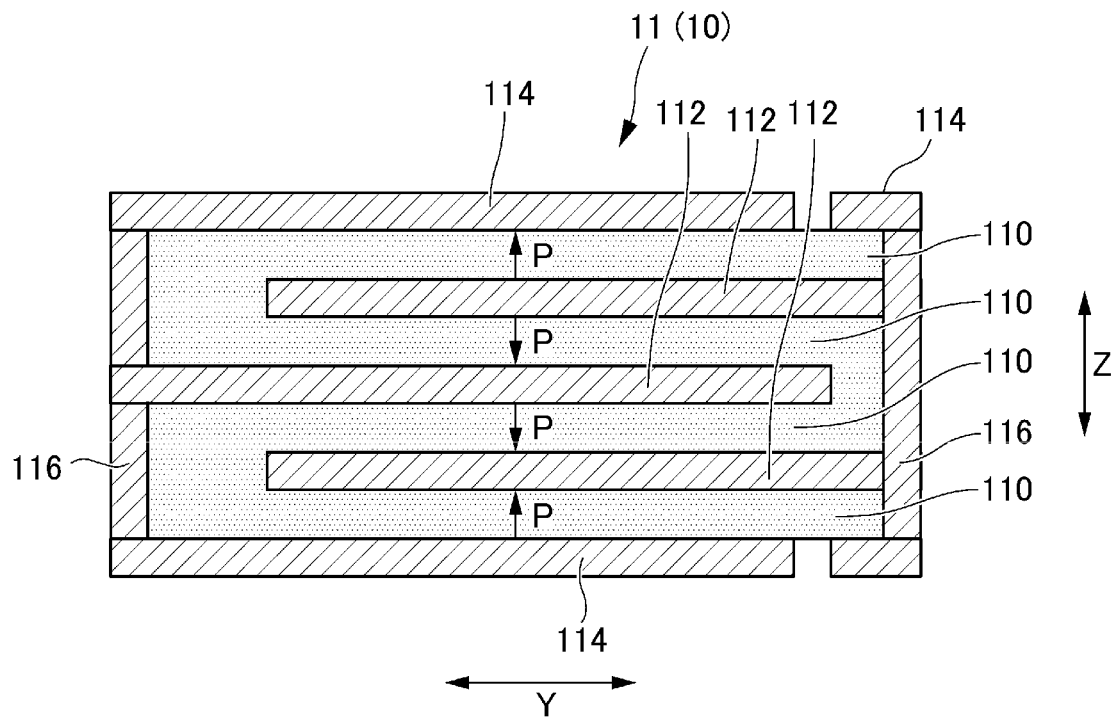
[FIG. 3]
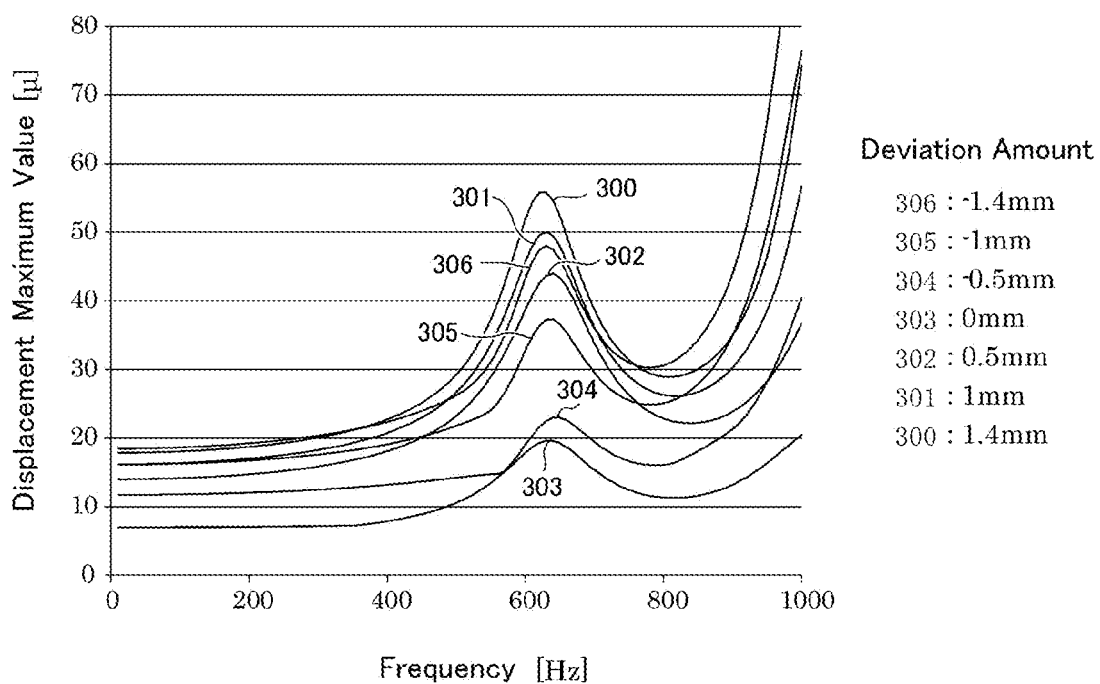

[FIG. 4]
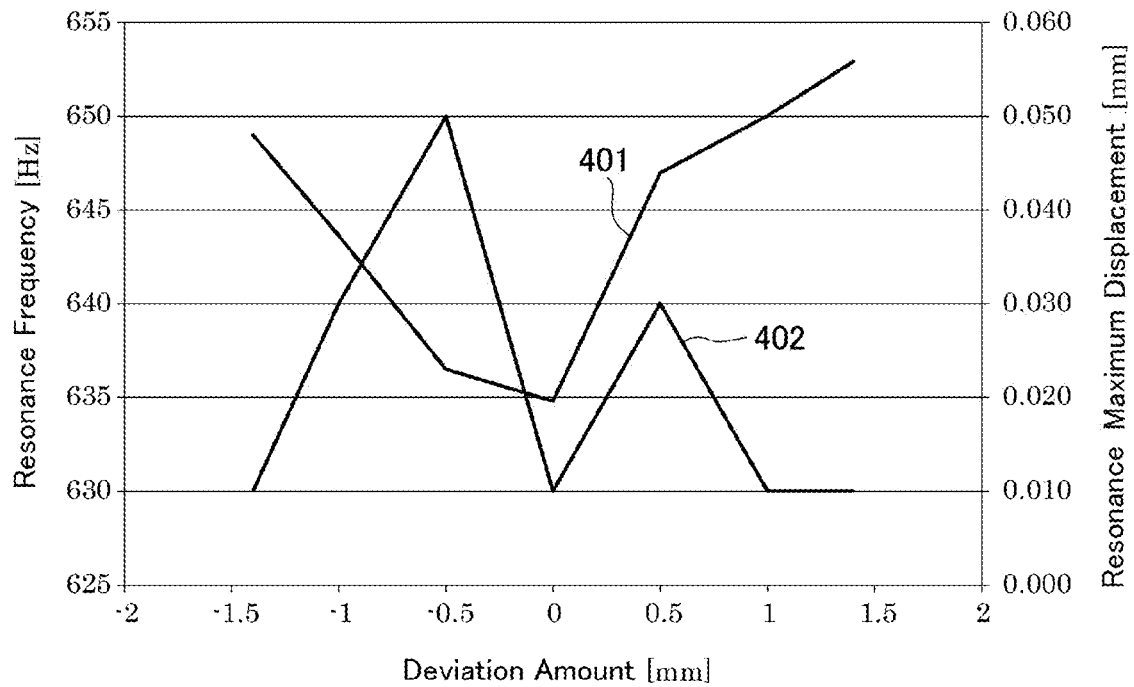
[FIG. 5]
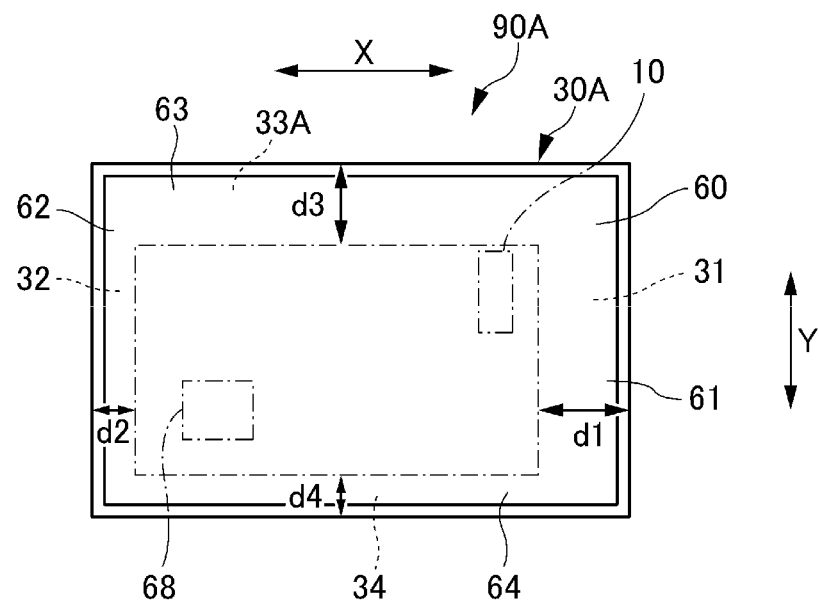

VIBRATION GENERATING DEVICE

TECHNICAL FIELD

The present invention relates to a vibration generating device.

BACKGROUND ART

There is known a sound generator including a piezoelectric element, a diaphragm vibrating through vibration of the piezoelectric element, and a pair of a first main surface side frame body and a second main surface side frame body holding outer circumferential portions of main surfaces of the diaphragm therebetween, wherein a center position of a shape within the first main surface side frame body is different from a center position of a shape within the second main surface side frame body as viewed from a direction perpendicular to the main surfaces (for example, see Patent Literature 1).

However, in the sound generator described in the above-mentioned Patent Literature 1, it is difficult to effectively increase a displacement amount at resonance frequency of a panel in a structure that a panel such as a diaphragm to be provided with a piezoelectric element is attached to a frame body (an example of a housing),

CITATION LIST

Patent Literature

[Patent Literature 1] Japanese Unexamined Patent Application Publication No. 2016-154298

SUMMARY OF INVENTION

Technical Problem

The present invention has been made in view of the above circumstances, and the present invention is to effectively increase a displacement amount at a resonance frequency of a panel to which a piezoelectric element is attached.

Solution to Problem

As a result of intensive studies, the inventors have found that it is possible to effectively increase the amount of displacement at the resonance frequency of the panel by devising the manner of attachment of the panel to a casing, such as a diaphragm to which the piezoelectric element is attached, and the present invention has been accomplished.

A vibration generating device according to a first aspect of the present invention includes: a housing in a rectangular shape as viewed in a first direction, the housing comprising: a first support portion extending along a first side in a second direction perpendicular to the first direction and; a second support portion extending along a second side opposite to the first side in the second direction; a panel supported by the first support portion and the second support portion; and a piezoelectric element attached to the panel in such a manner as to be shifted in the second direction toward the first side with respect to a central portion of the panel, wherein a width in the second direction of a portion of the panel supported by the first support portion is larger than a width in the second direction of a portion of the panel supported by the second support portion.

A width in the second direction of the first support portion may be larger than a width in the second direction of the second support portion.

The piezoelectric element may be in rectangular shape as viewed in the first direction, and a longitudinal direction of the piezoelectric element as viewed in the first direction may correspond to the second direction.

The housing further may include: a third support portion extending along a third side in a third direction perpendicular to the first direction and the second direction; and a fourth support portion extending along a fourth side opposite to the third side in the third direction; the panel is further supported by the third support portion and the fourth support portion; a width in the third direction of the third support portion is larger than a width in the third direction of the fourth support portion; and the piezoelectric element is attached to the panel in such a manner as to be shifted in the third direction toward the third side with respect to the central portion of the panel.

Advantageous Effects of Invention

In accordance with the present invention, it is possible to effectively increase a displacement amount at a resonance frequency of a panel to which a piezoelectric element is attached.

BRIEF DESCRIPTION OF DRAWINGS

FIG. 1A is a plan view schematically showing a vibration generating device according to a first embodiment of the present invention;

FIG. 1B is a cross-sectional view taken along a line A-A in FIG. 1A;

FIG. 2 is a schematic cross-sectional view showing a structure of a piezoelectric element as an example;

FIG. 3 is a diagram showing frequency characteristics of a displacement maximum value for each deviation amount;

FIG. 4 is a diagram showing a relationship between a deviation amount, a displacement maximum value and a resonance frequency; and FIG. 5 is a schematic plan view showing a vibration generating device 90A according to a second embodiment.

DESCRIPTION OF EMBODIMENTS

Hereinafter, a vibration generating device for non-acoustic applications according to embodiments of the present invention is described with reference to the accompanying drawings.

A vibration generating device according to a first embodiment of the present invention is described with reference to FIGS. 1 to 4. FIG. 1A is a plan view schematically showing a vibration generating device according to the first embodiment of the present invention. FIG. 1B is a cross-sectional view taken along a line A-A in FIG. 1A. FIG. 2 is a schematic sectional view showing a structure of a piezoelectric element as an example.

In FIGS. 1A and 1B, X-, Y- and Z-directions are shown as three mutually orthogonal directions. In the following description, the Z-direction (as an example in a first direction) corresponds to a vertical direction for the sake of explanation. However, in fact, it may correspond to any direction in accordance with a state that the vibration generating device 90 is attached.

In the first embodiment, the vibration generating device 90 is embodied as an electronic equipment, for example. The electronic equipment is configured in any type and, for example, it may be a mobile terminal such as a smartphone as shown in FIG. 1A. Besides, the electronic equipment may be a controller of a game machine, a wearable device, a tablet terminal, a portable music player or the like. Further, the electronic equipment may be embodied as an in-vehicle electronic equipment. Furthermore, the electronic equipment may be embodied as a household electronic equipment (a television, a vacuum cleaner, a washing machine, a refrigerator, a microwave oven, etc.).

The vibration generating device 90 includes a piezoelectric actuator 10, a housing 30 and a display panel 60 (as an example of a panel).

The piezoelectric actuator 10 may have any structure, and a structure as shown in FIG. 2 may be employed, for example. A piezoelectric element 11 of the piezoelectric actuator 10 is included in FIG. 2. The piezoelectric element 11 includes a piezoelectric layer 110 formed in four ceramics layers, an electrode laminate formed in three internal electrode layers 112 alternately laminated, surface electrodes 114 formed on one main surface (an upper surface) side and the other main surface (a lower surface) side of the electrode laminate, and side electrodes 116 formed on side surfaces of the internal electrode layers 112 which have end portions are alternately exposed. Note that the internal electrode layer 112, the surface electrode 114 and the side electrode 116 may be made of silver, a silver compound containing glass composed mainly of silica into silver, nickel or the like. In the following description, as an example, it is assumed that the piezoelectric actuator 10 is composed of the piezoelectric element 11 shown in FIG. 2.

The piezoelectric layer 110 is formed including ceramics with piezoelectric properties. Examples of such ceramics may include not only lead zirconate titanate but also a lead-free piezoelectric material such as lithium niobate, lithium tantalate, Bi layered compound and tungsten bronze structure compound.

The piezoelectric actuator 10 according to the first embodiment has a rectangular shape in a top view, but it may have another shape (a polygonal shape, a circular shape or the like). In addition, the piezoelectric actuator 10 may have a unimorph structure or may have a bimorph structure as shown in FIG. 2. In the bimorph structure, as shown by P-arrows indicating polarization directions in FIG. 2, the polarization directions with respect to a direction of the electric field generated when electric signals are applied to the surface electrode 114 are reversed toward one side and the other side in a thickness direction or the Z-direction. In the piezoelectric actuator 10 shown in FIG. 2, bending vibration is excited by applying electric signals to the surface electrode 114.

The piezoelectric actuator 10 is attached to a lower surface of the display panel 60. The piezoelectric actuator 10 may be attached to any area of the display panel 60, but it is preferably attached at a position offset from the center of the display panel 60. As shown in FIGS. 1A and 1B, the piezoelectric actuator 10 according to the first embodiment is offset toward a X2 side in the X-direction. A distance between the piezoelectric actuator 10 and a first support portion 31 in the X-direction may be, for example, about 1 to 1.5 mm taking into consideration attaching errors and the like of the display panel 60 with respect to the housing 30.

The piezoelectric actuator 10 may be obtained, for example, by preparing a slurry through mixing material powder of the piezoelectric layer 110 with an organic solvent, a binder, a plasticizer, a dispersant and the like at a predetermined ratio, making ceramic green sheets with a doctor blade method as known or the like, laminating the ceramic green sheet on the internal electrode and the external electrode, removing the binder at 500° C. in the atmosphere, and then integrally firing at 1,000° C. in the atmosphere. Not limited to the doctor blade method, the piezoelectric actuator 10 may also be obtained in another way, for example, by alternately printing and laminating a slurry containing material powder of the piezoelectric layer and a conductive paste containing an electrode material with a so-called slurry build method, and then integrally firing them.

The housing 30 is formed in a box-like that is recessed downwardly and opened upwardly to form an internal space 38. The housing 30 may be made of any material and, for example, it may be made of resin, aluminum or the like. An electronic circuit 68 for driving the piezoelectric actuator 10 and the like may be disposed in the internal space 38.

The housing 30 includes a first support portion 31, a second support portion 32, a third support portion 33 and a fourth support portion 34. The first support portion 31, the second support portion 32, the third support portion 33 and the fourth support portion 34 protrude upwardly from a bottom surface portion 36. The first support portion 31, the second support portion 32, the third support portion 33 and the fourth support portion 34 form a wall portion along an outer periphery of the bottom surface portion 36 of the housing 30.

The first support portion 31 and the second support portion 32 extend in the Y-direction and the Z-direction on both sides of the X-direction (as an example of a second direction). That is, the first support portion 31 extends along one side (as an example of a first side) of the X-direction, and the second support portion 32 extends along the other side (as an example of a second side) of the X-direction.

The third support portion 33 and the fourth support portion 34 extend in the X-direction and the Z-direction on both sides of the Y-direction (as an example in a third direction). That is, the third support portion 33 extends along one side (as an example of a third side) of the Y-direction, and the fourth support portion 34 extends along the other side (as an example of a fourth side) of the Y-direction.

The housing 30 may be formed integrally by the bottom surface portion 36, the first support portion 31, the second support portion 32, the third support portion 33 and the fourth support portion 34. Alternatively, the housing 30 may also be formed by joining a frame body composed of the first support portion 31, the second support portion 32, the third support portion 33 and the fourth support portion 34 to the bottom surface portion 36.

As shown in FIG. 1A, the first support portion 31, the second support portion 32, the third support portion 33 and the fourth support portion 34 have a width d1, a width d2, a width d3 and a width d4 in a top view, respectively. The width d1 and the width d2 are widths in the X-direction, and the width d3 and the width d4 are widths in the Y-direction. The width d1, the width d2, the width d3 and the width d4 may be about 1 to 2 mm.

In the first embodiment, the width d1 is larger than the width d2. That is, the first support portion 31 is larger than the second support portion 32 in a width in the X-direction. A ratio (d1/d2) of the width d1 to the width d2 is preferably set within a range of 1.3 to 1.5. The width d3 and the width d4 may be the same to each other and, for example, they may be the same to the width d2. Since the width d1 is larger than the width d2, it is possible to effectively increase a displacement amount at a resonance frequency of the display panel 60. This technical significance is described later with reference to FIGS. 3 and 4.

The display panel 60 may be, for example, a liquid crystal display panel or an organic EL (Electro Luminescence) display panel. A glass panel or the like with no display function may also be employed in place of the display panel 60.

The display panel 60 has a rectangular shape in a top view. Note that the rectangular shape includes conceptually not only a rectangle with a right angle but also a rectangle with a corner radius.

The display panel 60 is supported by the first support portion 31, the second support portion 32, the third support portion 33 and the fourth support portion 34 of the housing 30. Specifically, the display panel 60 includes a first supported portion 61 that is a portion supported by the first support portion 31, a second supported portion 62 that is a portion supported by the second support portion 32, a third supported portion 63 that is a portion supported by the third support portion 33 and a fourth supported portion 64 that is a portion supported by the fourth support portion 34. The first supported portion 61, the second supported portion 62, the third supported portion 63 and the fourth supported portion 64 form the outer peripheral portion of the display panel 60.

Here, a width (a supported width) in the X-direction supported by the first support portion 31 of the display panel 60 corresponds to a width of the first supported portion 61 in the X-direction, and a width (a supported width) in the X-direction supported by the second support portion 32 of the display panel 60 corresponds to a width of the second supported portion 62 in the X-direction. A width (a supported width) in the Y-direction supported by the third support portion 33 of the display panel 60 corresponds to a width of the third supported portion 63 in the Y-direction, and a width (a supported width) in the Y-direction supported by the fourth support portion 34 of the display panel 60 corresponds to a width of the fourth supported portion 64 in the Y-direction.

The display panel 60 is supported by the housing 30 via the joining member 69. The joining member 69 may be formed in a double-sided tape having adhesive layers adhered to both surfaces of a substrate such as a nonwoven fabric, or in a foam body. The joining member 69 may be entirely provided on upper surfaces of the first support portion 31, the second support portion 32, the third support portion 33 and the fourth support portion 34. Alternatively, the joining member 69 may be provided in such a manner as to protrude from upper surfaces of the first support portion 31, the second support portion 32, the third support portion 33 and the fourth support portion 34.

Here, a width of the display panel 60 in the X-direction may be the same to a width of the housing 30 in the X-direction (a distance between the outermost edge of the first support portion 31 in the X-direction and the outermost edge of the second support portion 32 in the X-direction), but it is preferable that it is slightly smaller than the width of the housing 30 in the X-direction taking into consideration assembling errors and the like. A width of the display panel 60 in the Y-direction may be the same to a width of the housing 30 in the Y-direction (a distance between the outermost edge of the third support portion 33 in the Y-direction and the outermost edge of the fourth support portion 34 in the Y-direction), but it is preferable that it is slightly smaller than the width of the housing 30 in the Y-direction taking into consideration assembling errors and the like. When an outer shape of the display panel 60 completely matches an outer shape of the housing 30 in a top view, each supported width of the first supported portion 61, the second supported portion 62, the third supported portion 63 and the fourth supported portion 64 corresponds to the width d1, d2, d3 and d4 of the first support portion 31, the second support portion 32, the third support portion 33 and the fourth support portion 34, respectively. When the outer shape of the display panel 60 is smaller than the outer shape of the housing 30, each supported width of the first supported portion 61, the second supported portion 62, the third supported portion 63 and the fourth supported portion 64 are smaller than the width d1, d2, d3 and d4 of the first support portion 31, the second support portion 32, the third support portion 33 and the fourth support portion 34, respectively.

When electric signals are applied to the piezoelectric actuator 10 of the vibration generating device 90, the piezoelectric actuator 10 performs bending vibration. As a result, the display panel 60 vibrates. That is, the display panel 60 vibrates together with the piezoelectric actuator 10 through vibration of the piezoelectric actuator 10. Thus, the vibration generating device 90 may function as a tactile presentation device (for example, a force feedback device) that presents a tactile sense to a user through vibration or the like via the display panel 60. In another manner, the vibration generating device 90 may function as an acoustic speaker (for example, a speaker for receiving sound in a smartphone).

Next, with reference to FIGS. 3 and 4, described is a relationship among the width (hereinafter referred to as "a first support width") in the X-direction supported by the first support portion 31 of the display panel 60, the width (hereinafter referred to as "a second support width") in the X-direction supported by the second support portion 32 of the display 60, and the characteristics of the vibration generating device 90 according to the first embodiment.

In the following description, "a deviation amount=0 (zero)" means that a difference between the first support width and the second support width is 0 (zero). A positive direction of the deviation amount corresponds to a direction in which the first support width increases.

FIG. 3 is a diagram showing frequency characteristics of a displacement maximum value for each deviation amount, which shows simulation results. FIG. 4 is a diagram showing a relationship between a deviation amount, a displacement maximum value (a resonance maximum displacement) and a resonance frequency, which is based on simulation results shown in FIG. 3.

The simulation is performed in a frequency response analysis with a finite element method, and the conditions are as follows. The display panel 60 is a typical glass (a soda glass) having a panel size of 100×70 mm and a plate thickness of 0.5 mm. A distance in the X-direction from the piezoelectric actuator 10 (the piezoelectric element 11) to the end portion of the display panel 60 is 3.5 mm (when the deviation amount=0 (zero)), both the first support width and the second support width are 2 mm (when the deviation amount=0 (zero)), and the display panel 60 is fixed with a double-sided tape (a plate thickness of 0.14 mm). Further, the piezoelectric actuator 10 has a shape of 53×8 mm and a plate thickness of 0.3 mm. In addition, the piezoelectric actuator 10 is fixed with an epoxy resin (a thickness of 5 μm).

In FIG. 3, the frequency characteristics are shown when the deviation amounts are set in 0, ±0.5, ±1, ±1.4 [mm], wherein the frequency [Hz] is taken on the lateral axis and the displacement maximum value [mm] is taken on the longitudinal axis. That is, a curve 300 shows a characteristic when the deviation amount=1.4, a curve 301 shows a characteristic when the deviation amount=1, a curve 302 shows a characteristic when the deviation amount=0.5, a curve 303 shows a characteristic when the deviation amount=0, and so on. The displacement maximum value represents a displacement in maximum (a displacement at the resonance frequency) of the display panel 60.

In FIG. 4, a change characteristic 401 of the displacement maximum value with respect to change of the deviation amount and a change characteristic 402 of the frequency with respect to change of the deviation amount are shown, wherein the deviation amount [mm] is taken on the lateral axis, the resonance frequency [Hz] are taken on the left longitudinal axis and the displacement maximum value [mm] are taken on the right longitudinal axis.

As shown in FIGS. 3 and 4, it is found that the displacement maximum value tends to become larger as the deviation amount increases in the positive direction. Further, it is found that an increase gradient of the displacement maximum value tends to become larger in a case where the deviation amount increases in the positive direction (that is, a case where the first support width is larger than the second support width) as compared with a case where the deviation amount increases in the negative direction (that is, a case where the second support width is larger than the first support). Also, it is also found that even if the deviation amount changes, the resonance frequency does not greatly change.

According to the first embodiment, as shown in FIGS. 3 and 4, the resonance frequency does not greatly change (that is, it can be kept within a range of 20 Hz) even if the deviation amount changes. In particular, when the deviation amount is in the range of 0 to 1.4 [mm], it is possible to suppress fluctuation of the resonance frequency to about 10 Hz.

Further, according to the first embodiment, as shown in FIGS. 3 and 4, when the deviation amount becomes larger than 0 (zero), the displacement maximum value increases. That is, when the deviation amount is caused larger than 0 (zero), the characteristics of the vibration generating device 90 change in an advantageous direction. In particular, when the deviation amount is in the range of 0.5 to 1.4 [mm], the displacement maximum value significantly increases resulting in that vibration characteristics become excellent.

In the first embodiment as described above, the first support width is made larger than the second support width by making the width d1 of the first support portion 31 larger than the width d2 of the second support portion 32, but it is not limited thereto. For example, the first support width may be made larger than the second support width by shifting an attaching position of the display panel 60 with respect to the housing 30 in the X-direction relative to a regular position (a nominal position) while equalizing the width d1 of the first support portion 31 and the width d2 of the second support portion 32 in the housing 30.

Next, a vibration generating device according to another embodiment is described. In the description of another embodiment, the details of constituent elements that may be the same as the above-described first embodiment are omitted by assigning the same reference signs thereto.

FIG. 5 is a schematic plan view showing a vibration generating device 90A according to a second embodiment.

The vibration generating device 90A according to the second embodiment is different from the vibration generating device 90 according to the first embodiment in that the housing 30 is replaced with a housing 30A and an attaching position of the piezoelectric actuator 10 with respect to the display panel 60.

Specifically, the housing 30A is different from the housing 30 according to the above-described first embodiment in that the third support portion 33 is replaced with a third support portion 33A. The third support portion 33A is different from the third support portion 33 according to the first embodiment in that the width d3 is enlarged. That is, in the second embodiment, the third support portion 33A is larger than the fourth support portion 34 in a width in the Y-direction. A ratio (=d3/d4) of the width d3 to the width d4 is preferably set within a range of 1.3 to 1.5. The width d3 may be the same to the width d1, and the width d2 may be the same to the width d4.

Even in the Y-direction in addition to the X-direction, the piezoelectric actuator 10 is attached at a position offset from the center of the display panel 60. Specifically, the piezoelectric actuator 10 is offset toward a side close to the third support portion 33A in the Y-direction. A distance between the piezoelectric actuator 10 and the third support portion 33A in the Y-direction may be, for example, about 1 to 1.5 mm taking into consideration attaching errors and the like of the display panel 60 with respect to the housing 30A.

Even with the second embodiment, it is possible to achieve effects similar to those of the above-described first embodiment.

In the second embodiment as described above, a width in the Y-direction supported by the third support portion 33A in the display panel 60 (hereinafter referred to as "a third support width") is made larger than a width in the Y-direction (hereinafter referred to as "a fourth support width") supported by the fourth support portion 34 of the display panel 60 by making the width d3 of the third support portion 33A larger than the width d4 of the fourth support portion 34, but it is not limited thereto. For example, the third support width may be made larger than the fourth support width by shifting an attaching position of the display panel 60 with respect to the housing 30A in the Y-direction relative to a regular position (a nominal position), while equalizing the width d3 of the third support portion 33A and the width d4 of the fourth support portion 34 in the housing 30A.

REFERENCE SIGNS LIST

10 . . . piezoelectric actuator;
11 . . . piezoelectric element;
30, 30A . . . housing;
31 . . . first support portion;
32 . . . second support portion;
33 . . . third support portion;
33A . . . third support portion;
34 . . . fourth support portion;
36 . . . bottom surface portion
38 . . . internal space
60 . . . display panel
61 . . . first supported portion
62 . . . second supported portion
63 . . . third supported portion
64 . . . fourth supported portion
68 . . . electronic circuit
69 . . . joining member
90 . . . vibration generating device
90A . . . vibration generating device
110 . . . piezoelectric layer
112 . . . internal electrode layer
114 . . . surface electrode
116 . . . side electrode

The invention claimed is:

1. A vibration generating device comprising:
a housing in a rectangular shape as viewed in a first direction, the housing comprising:

a first support portion extending along a first side which is one of two sides facing each other in a second direction perpendicular to the first direction and;

a second support portion extending along a second side opposite to the first side in the second direction;

a panel supported by the first support portion and the second support portion; and a piezoelectric element attached to the panel in such a manner as to be shifted in the second direction toward the first side with respect to a central portion of the panel, wherein a width in the second direction of a portion of the panel supported by the first support portion is larger than a width in the second direction of a portion of the panel supported by the second support portion, wherein the first support portion supports the panel over an entire length of a region of the panel in a direction along the first side, wherein the region corresponds to a region of the panel to which the piezoelectric element attached as viewed in the second direction, and the second support portion supports the panel over an entire length of a region of the panel in a direction along the second side, wherein the region corresponds to a region of the panel to which the piezoelectric element attached as viewed in the second direction.

2. The vibration generating device according to claim 1, wherein a width in the second direction of the first support portion is larger than a width in the second direction of the second support portion.

3. The vibration generating device according to claim 1, wherein the piezoelectric element is in rectangular shape as viewed in the first direction, and a longitudinal direction of the piezoelectric element as viewed in the first direction corresponds to the second direction.

4. The vibration generating device according to claim 1, wherein a width in the second direction of the first support portion is larger over an entire length of the first portion in the second direction than a width in the second direction of the second support portion.

5. A vibration generating device —comprising:

a housing in a rectangular shape as viewed in a first direction, the housing comprising:

a first support portion extending along a first side in a second direction perpendicular to the first direction and;

a second support portion extending along a second side opposite to the first side in the second direction;

a panel supported by the first support portion and the second support portion; and a piezoelectric element attached to the panel in such a manner as to be shifted in the second direction toward the first side with respect to a central portion of the panel, wherein a width in the second direction of a portion of the panel supported by the first support portion is larger than a width in the second direction of a portion of the panel supported by the second support portion, wherein the housing further comprises:

a third support portion extending along a third side in a third direction perpendicular to the first direction and the second direction; and a fourth support portion extending along a fourth side opposite to the third side in the third direction;

the panel is further supported by the third support portion and the fourth support portion;

a width in the third direction of the third support portion is larger than a width in the third direction of the fourth support portion; and the piezoelectric element is attached to the panel in such a manner as to be shifted in the third direction toward the third side with respect to the central portion of the panel.

6. The vibration generating device according to claim 5, wherein a width in the second direction of the first support portion is larger than a width in the second direction of the second support portion.

\* \* \* \* \*